United States Patent
Hack et al.

(10) Patent No.: US 10,037,302 B2
(45) Date of Patent: *Jul. 31, 2018

(54) CACHE MANAGEMENT IN RDMA DISTRIBUTED KEY/VALUE STORES BASED ON ATOMIC OPERATIONS

(71) Applicant: International Business Machines Corporation, Armonk, NY (US)

(72) Inventors: Michel H. Hack, Cortlandt Manor, NY (US); Yufei Ren, Somers, NY (US); Yandong Wang, Elmsford, NY (US); Li Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/953,488

(22) Filed: Nov. 30, 2015

(65) Prior Publication Data

US 2017/0109317 A1    Apr. 20, 2017

Related U.S. Application Data

(63) Continuation of application No. 14/885,320, filed on Oct. 16, 2015.

(51) Int. Cl.
*G06F 15/167* (2006.01)
*G06F 12/0813* (2016.01)
(Continued)

(52) U.S. Cl.
CPC ........ *G06F 15/167* (2013.01); *G06F 12/0813* (2013.01); *G06F 17/00* (2013.01); *H04L 67/2847* (2013.01); *G06F 2212/154* (2013.01)

(58) Field of Classification Search
None
See application file for complete search history.

(56) References Cited

U.S. PATENT DOCUMENTS 9,170,911 B1 * 10/2015 Atsatt ................. G06F 11/0724
2004/0015519 A1 * 1/2004 Maeda .................. G06Q 10/00
(Continued)

FOREIGN PATENT DOCUMENTS

KR    20050021087    *  3/2005

OTHER PUBLICATIONS

Hack et al., "Cache Management in RDMA Distributed Key/Value Stores Based on Atomic Operations", U.S. Appl. No. 14/885,320, filed Oct. 16, 2015.
(Continued)

*Primary Examiner* — Younes Naji
(74) *Attorney, Agent, or Firm* — Cantor Colburn LLP; Yeen Tham

(57) ABSTRACT

A cache management system performs cache management in a Remote Direct Memory Access (RDMA) key value data store. The cache management system receives a request from at least one client configured to access a data item stored in a data location of a remote server, and determines a popularity of the data item based on a frequency at which the data location is accessed by the at least one client. The system is further configured to determine a lease period of the data item based on the frequency and assigning the lease period to the data location.

6 Claims, 6 Drawing Sheets

(51) Int. Cl.
*H04L 29/08* (2006.01)
*G06F 17/00* (2006.01)

(56) References Cited

U.S. PATENT DOCUMENTS

| | | | |
|---|---|---|---|
| 2007/0156588 A1* | 7/2007 | Howell | G06F 9/526 705/51 |
| 2012/0221708 A1* | 8/2012 | Bhardwaj | H04L 67/10 709/224 |
| 2013/0144906 A1* | 6/2013 | Bhupalam | H04L 65/4084 707/771 |
| 2014/0143364 A1* | 5/2014 | Guerin | G06F 15/17331 709/212 |

OTHER PUBLICATIONS

List of IBM Patents or Patent Applications Treated as Related; (Appendix P), Filed Feb. 8, 2016; 2 pages.

\* cited by examiner

CACHE MANAGEMENT IN RDMA DISTRIBUTED KEY/VALUE STORES BASED ON ATOMIC OPERATIONS

DOMESTIC PRIORITY

This application is a continuation of U.S. patent application Ser. No. 14/885,320, filed Oct. 16, 2015, the disclosure of which is incorporated by reference herein in its entirety.

BACKGROUND

The present invention relates generally to cache management and more particularly to cache management in a Remote Direct Memory Access (RDMA) data store.

RDMA is a data computing technique whereby data is fetched directly out of a host computer's memory and directly placed into the memory of a client without requiring the processor of the host computer to process the read request. In this manner, RDMA allows for bypassing the operating system of the host computer and avoids intermediate data copies in memory of the host computer. Accordingly, RDMA significantly reduces the load on the processor of the host computer for large data transfers and provides high throughput with low latency.

Resource reclamation of the cache is typically achieved by evicting or purging key/value items that are no longer relevant. The relevancy of a key/value item stored in the cache may be determined based on the frequency rate at which a particular key/value item is accessed. However, one consequence resulting from RDMA for cache data storage is that the host computer is not made aware of the accesses conducted by clients. Thus, it is not possible for the host computer to track how frequently each of the data items stored in the cache are accessed. This lack of information can lead to the host computer performing undesired evictions of data items from the cache if traditional cache management algorithms, e.g., LRU, CLOCK, are used. That is, the host computer may not be aware of the frequency rate at which one or more clients receive requests to fetch one or more particular key/value items in the cache. Therefore, the host computer may not be able to properly determine a proper lease time for the key/value items stored in the cache. Consequently, lease terms may be inappropriately defined, i.e., may be too short or too long. To compensate for the lack of information, some solutions instruct computers to inform the host computer of all cache data accesses. However, this approach generates a large number of messages that need to be processed by the host computer causing significant reduction in the performance benefits of RDMA.

SUMMARY

According to a non-limiting embodiment, a cache management system performs cache management in a Remote Direct Memory Access (RDMA) key value data store. The cache management system receives a request from at least one client configured to access a data item stored in a data location of a remote server, and determines a popularity of the data item based on a frequency at which the data location is accessed by the at least one client. The system is further configured to determine a lease period of the data item based on the frequency and assigning the lease period to the data location.

According to another non-limiting embodiment, a method of performing cache management in a Remote Direct Memory Access (RDMA) key value data store comprises receiving a request from at least one client configured to access a data item stored in a data location of a remote server, and determining a popularity of the data item based on a frequency at which the data location is accessed by the at least one client. The method further includes calculating a lease period of the item based on the frequency and assigning the lease period to the data location.

According to yet another non-limiting embodiment, a computer program product performs a cache management in a Remote Direct Memory Access (RDMA) key value data store. The computer program product comprises a tangible storage medium readable by an electronic processing circuit. The tangible storage medium stores instructions for execution by the processing circuit so as to perform a method including operations comprising: receiving a request from at least one client configured to access a data item stored in a data location of a remote server, determining a popularity of the data item based on a frequency at which the data location is accessed by the at least one client, and calculating a lease period of the item based on the frequency and assigning the lease period to the data location.

According to still another non-limiting embodiment, a cache management system is configured to perform cache management in a Remote Direct Memory Access (RDMA) key value data store. The cache management system comprises an electronic data server including at least one data location configured to store a data item, and at least one electronic client located remotely from the data server. The at least one client is configured to access to the data item stored in the data location using a RDMA remote pointer. The server determines a popularity of the data item based on a frequency at which the data location is accessed by the at least one client, and calculates a lease period of the data item based on the frequency and assigning the lease period to the data location.

Additional features are realized through the techniques of the various non-limiting embodiments. Other embodiments are described in detail herein and are considered a part of the claimed invention. For a better understanding of the invention with the features, refer to the description and to the drawings.

DETAILED DESCRIPTION

Various embodiments described herein provide a system that performs cache management for Remote Direct Memory Access (RDMA) key/value data store based on atomic operations. According to a non-limiting embodiment, the cache management system leverages the advantage of co-designing the servers and clients such that clients can periodically propagate necessary access frequency rates to one or more servers. The access frequency rate is added to a register i.e., data location, in the server according to various atomic operations that may occur simultaneously or in sequence but without interruption for a specific task to be accomplished properly. For instance, the atomic operations executed by the cache system may leverage fetch/add operations performed by each individual client so as to add and replace values into a data location stored in the server intended to store the access frequency rate of a particular key/value item. In this manner, the servers can monitor the data location that includes the dynamically changing access frequency rate and maintain global access patterns of cached data.

In addition, the cache management system according to a non-limiting embodiment determines lease time to manage data items, and also dynamically determines the lease times for different items according to their rate of access as well as the operation types. The lease time stands as a pact between server and client to guarantee the availability of the data so that clients can efficiently retrieve the data by using RDMA Read, while also preventing premature eviction and reclamation of key/value items stored in the cache. In this manner, the cache management system according to various embodiments is capable of specifically keeping track of the access frequency of the cached data thereby incurring very little overhead while also preserving the validity of key/value items in the cache.

Figure 1:
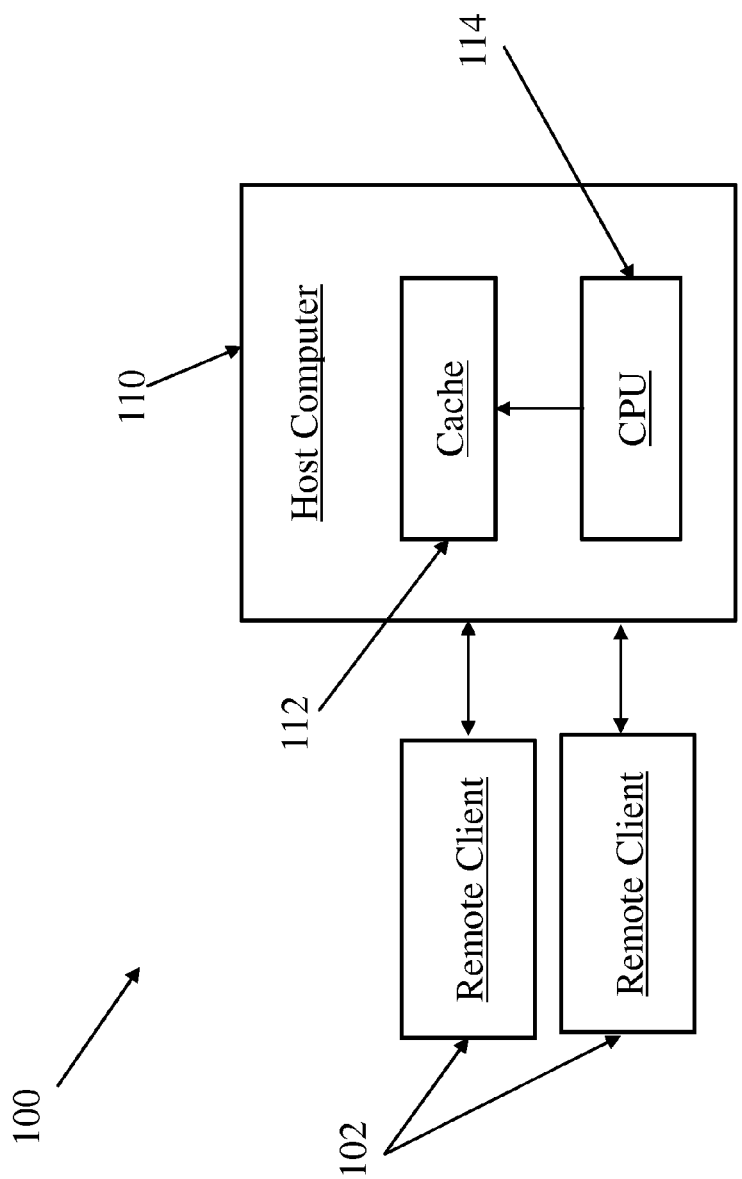
FIG. 1 is a block diagram illustrating a cache management system configured to perform cache management of an RDMA key/value data store according to a non-limiting embodiment.

With reference now to FIG. 1, a cache management system 100 configured to perform cache management for Remote Direct Memory Access (RDMA) key/value data store based on atomic operations is illustrated according to a non-limiting embodiment. The cache management system 100 includes one or more remote computers, i.e., clients 102 in signal communication with a host computer 110. The clients 102 are configured to access a cache 112 stored on a host computer 110 by executing various atomic operations. The atomic operations may comprise a group of operations that may occur simultaneously or in sequence but without interruption for a specific task to be accomplished properly. For instance, atomic operations may be implemented in spin-locks inside of an operating system and/or monotonically incrementing sequence numbers. Atomic operations may include the examination of data, conditional or unconditional modification of data, and/or placement of a new value or item into a data location in the cache 112 using, for example, an atomic fetch and add (i.e. fetch/add) operation. The atomic operations may also include returning a response on the result of the operation with previous or subsequent values of the data or the like. In non-limiting embodiments, the host computer 110 utilizes RDMA cache management operations to allow each of the clients 102 to access data stored in the cache 112 without requiring the CPU 114 of the host computer 110 to process the read request.

In non-limiting embodiments, when a client 102 requests access to a data item from cache 112 of the host computer 110 for the first time, the host computer 110 returns a remote pointer to the data item in the cache of the client. The remote pointer indicates the location of the data item inside of the cache 112. Once the client 102 has a remote pointer, an RDMA read can be used to retrieve the data item without requiring any action by the CPU 114 of the host computer 110.

In non-limiting embodiments, in response to receiving an access request from a client 102, the host computer 110 computer enters into a lease with the client 102 for the requested data item. The lease is an agreement between host computer 110 and client 102 that grants the client 102 the privilege to conduct RDMA reads and guarantees the availability of the data item until an expiration time. In non-limiting embodiments, the host computer maintains a global view of access patterns of data items stored in the cache by assigning a lease to every one of the data items stored in the cache. In non-limiting embodiments, while the lease grants the holder the privilege to conduct RDMA read, it may not grant the holder the privilege to update the data item.

In non-limiting embodiments, the term, or length, of the lease may be determined by the access history of the data item. In general, the use of a single fixed lease term for all of the data items is inefficient because long-lease term can cause cache to be populated with unpopular items and short-lease term can cause frequent remote pointer invalidation, thus low utilization of RDMA. In non-limiting embodiments, assigning longer term leases to data items exhibiting frequent reads is more beneficial than doing so for items with frequent updates but fewer reads. In non-limiting embodiments, the lease term for each item shall be determined by considering several factors which include, but are not limited to, an operation event for a data item, and an access frequency of a data item.

In non-limiting embodiments, every time an operation that the host computer is aware of, such as a (e.g., read, write or update) that accesses the data item, the lease may be extended by a time period. In one embodiment, the lease extension may be calculated by lease=now+term to prevent lease from being extended without limit when a large number of clients access the data simultaneously. The host computer may embed the extended lease term in the returning values to inform the client the valid time range during which RDMA read can be applied to fetch the data.

Figure 2:
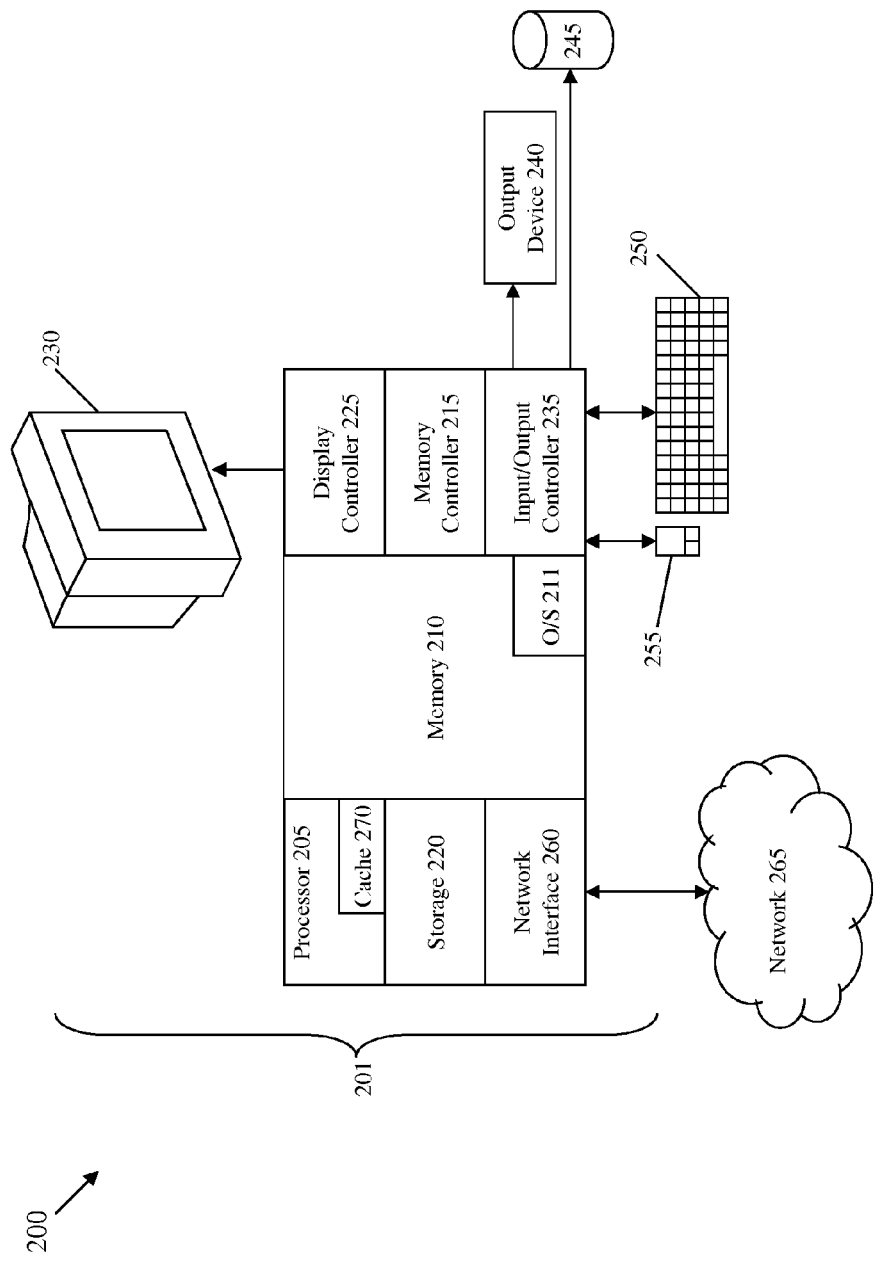
FIG. 2 is a block diagram illustrating a computing system implementing a cache management system configured to perform cache management of an RDMA key/value data store according to a non-limiting embodiment.

FIG. 2 illustrates a block diagram of a non-limiting computer system 200 for use with the teachings herein. The methods described herein can be implemented in hardware software (e.g., firmware), or a combination thereof. In a non-limiting embodiment, the methods described herein are implemented in hardware, and is part of the microprocessor of a special or general-purpose digital computer, such as a personal computer, workstation, minicomputer, mainframe computer, or computer server system. The system 200 therefore includes general-purpose computer 201.

In a non-limiting embodiment, in terms of hardware architecture, as shown in FIG. 2, the computer 201 includes a processor 205, memory 210 coupled via a memory controller 215, a storage device 220, and one or more input and/or output (I/O) devices 240, 245 (or peripherals) that are communicatively coupled via a local input/output controller 235. According to a non-limiting embodiment, the computer 201 is configured as a host server capable of operating with one or more remote computers, i.e., clients 102, to perform cache management for an RDMA key/value data store according to a non-limiting embodiment.

The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 220 may include one or more hard disk drives (HDD), solid state drives (SSD), or any other suitable form of storage.

The processor 205 is a computing device for executing hardware instructions or software, particularly that stored in memory 210. The processor 205 can be any custom made or commercially available processor, a central processing unit (CPU), an auxiliary processor among several processors associated with the computer 201, a semiconductor based microprocessor (in the form of a microchip or chip set), a microprocessor, or generally any device for executing instructions. The processor 205 may include a cache 270, which may be organized as a hierarchy of more cache levels (L1, L2, etc.). One or more remote computers i.e., clients 102, is in signal communication with the computer 201 via the network 265. In this manner, the clients 102 may perform RDMA so as to fetch/add data or items directly from/to one or more data locations of the host computer 201 without requiring the processor of the host computer 201 to process the read request.

The memory 210 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially controls the execution of other computer programs and provides scheduling, input-output control, file and data management, memory management, and communication control and related services.

In a non-limiting embodiment, a conventional keyboard 250 and mouse 255 can be coupled to the input/output controller 235. Other output devices such as the I/O devices 240, 245 may include input devices, for example but not limited to a printer, a scanner, microphone, and the like. Finally, the I/O devices 240, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 200 can further include a display controller 225 coupled to a display 230. In a non-limiting embodiment, the system 200 can further include a network interface 260 for coupling to a network 165.

The network 265 can be an IP-based network for communication between the computer 201 and any external server, client and the like via a broadband connection. The network 265 transmits and receives data between the computer 201 and external systems. In a non-limiting embodiment, the network 265 can be a managed IP network administered by a service provider. The network 265 may be implemented in a wireless fashion, e.g., using wireless protocols and technologies, such as Wi-Fi, WiMax, etc. The network 265 can also be a packet-switched network such as a local area network, wide area network, metropolitan area network, Internet network, or other similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstation, intelligent device or the like, the instructions in the memory 210 may further include a basic input output system (BIOS) (omitted for simplicity). The BIOS is a set of essential routines that initialize and test hardware at startup, start the OS 211, and support the transfer of data among the storage devices. The BIOS is stored in ROM so that the BIOS can be executed when the computer 201 is activated. When the computer 201 is in operation, the processor 205 is configured to execute instructions stored within the memory 210, to communicate data to and from the memory 210, and to generally control operations of the computer 201 pursuant to the instructions.

Figure 3:
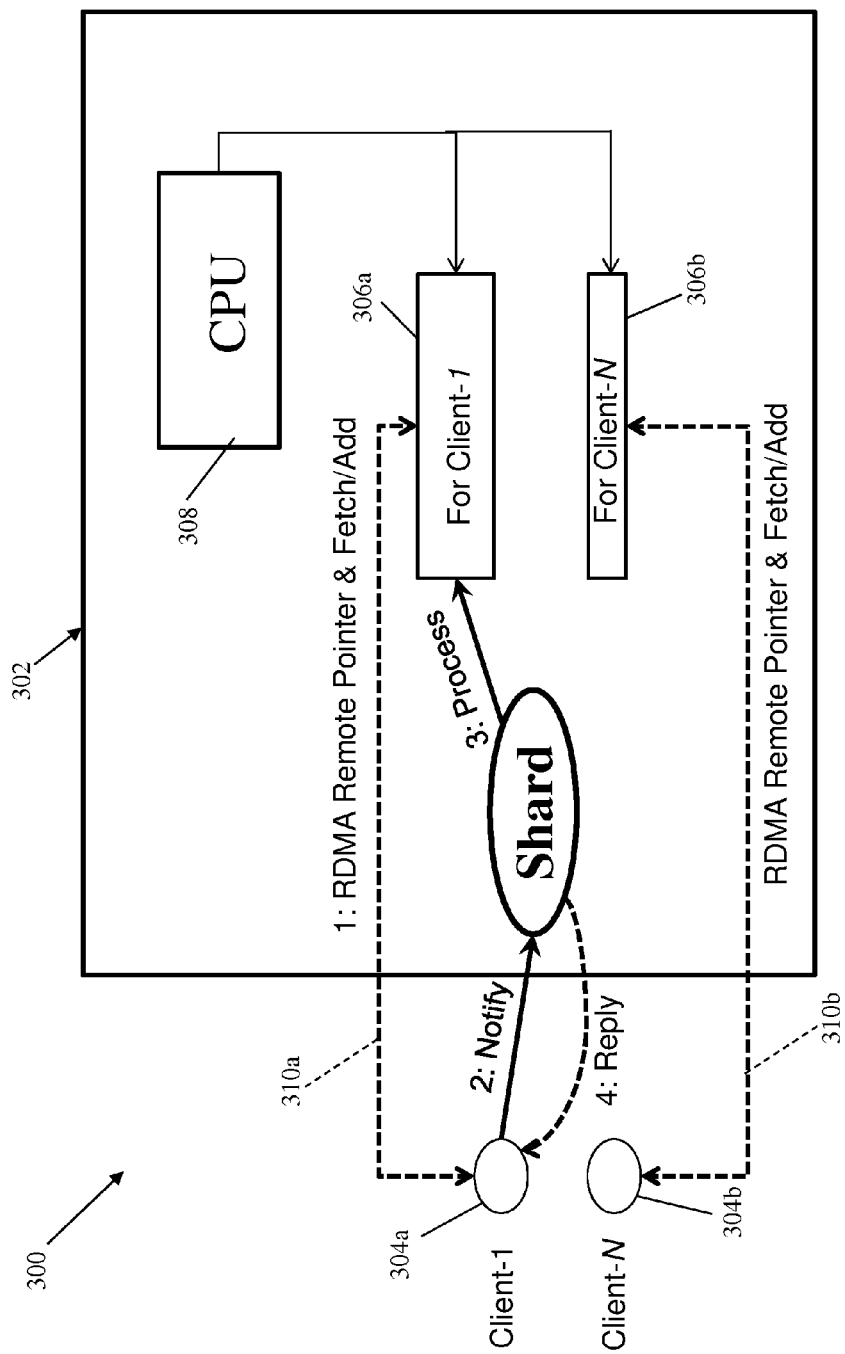
FIG. 3 is a block diagram illustrating, a cache management system using RDMA remote pointers to perform cache management of an RDMA key/value data store is illustrated according to a non-limiting embodiment.

Turning now to FIG. 3, a cache management system 300 configured to perform cache management for an RDMA key/value data store is illustrated according to a non-limiting embodiment. According to a non-limiting embodiment, the cache management system 300 is designed according to a non-uniform memory access (NUMA) architecture to facilitate RDMA key/value data store operation. The cache management system 300 may also be implemented in a general-purpose in-memory key-value middleware, or hydra database (HydraDB). A HydraDB synthesizes a collection of state-of-the-art techniques, including, but not limited to, continuous fault-tolerance, Remote Direct Memory Access (RDMA), and awareness for multicore systems, to deliver a high-throughput, low-latency access service in a reliable manner for cluster computing applications.

The cache management system 300 includes a server 302 in signal communication with one or more remote client nodes 304a-304b. The server 302 includes one or more data locations 306a-306b, and an electronic computer processor 308 configured to access the data locations 306a-306b. When accessing the data locations 306a-306b, the computer processor 308 can read and/or write data thereto. According to a non-limiting embodiment, the computer processor 308 is configured as an electronic node manager agent 308 capable of accessing and processing various data locations and managing the server 302.

The clients 304a-304b utilize a remote pointer 310a-310b to directly access the data locations 306a-306b located on a remote node of the server 302. According to a non-limiting embodiment, the server 302 exports a remote pointer 310a to a client 302a that refers to a data value or item in a pinned and registered data location 306a stored in the memory of the server 302. The data values or items stored in the data location 306a of the server 302 provide a cache. Thus, RDMA operations allow the clients 304a-304b to directly access a value or item stored in a corresponding data locations of the server 302 using a respective remote pointer 408a-408b to reduce overhead and latency.

According to a non-limiting embodiment, the client 304a-304b remotely controls the RDMA of the server 302. For example, a remote pointer 310a is retrieved from the memory of the client 304a-304b. A particular client 304a-304b then transmits a respective remote pointer 310a-310b to the server 302. The remote point includes a hash designating a key and value <key,value> corresponding to a particular data location 306 that stores a value that is requested by the client. If the <key,value> designated by the remote pointer 310a-310b is valid and exists, the client 310a-310b performs DMA (direct memory access) operations so as to transfer data values into and out of the memory of the Server 302.

These RDMA operations do not require execution of any software in the server 302 or 304a-304b, and thus there is no involvement from the server computer or node manager agent 308 and no central processing unit (CPU) utilization by the server 302 or client 304a-304b to perform the RDMA operations. The RDMA operations therefore result in very fast, near wire-speed, remote access by the clients 304a-304b into and out of the memory of the server 302 (and similarly, remote access by the server 302 into and out of the memory of the clients 304a-304b). For example, an add/fetch operations performed by the clients 304a-304b of a data value stored in the memory of the server 302 can occur within single-digit microseconds, for example.

According to a non-limiting embodiment, a hash map is used with the RDMA operations. The server 302 creates the hash map to store the remote pointers 310a-310b and publishes or exports the hash maps to the clients 304a-304b. Each entry or slot in the hash map is associated with a key for a record and stores an object-value corresponding to the data value stored in a corresponding data location 306a-306b. The server 302 publishes the hash map to one or more clients 304a-304b at some designated time, e.g., at client startup, at server startup, when the hash map changes, upon request, at certain intervals, etc., (represented by arrow 1). The clients 304a-304b received the remote pointer and stored the hash <key, value> in the client memory.

The servers 304a-304b can also utilize a message-based interface supported by RDMA operations to communicate (i.e., send and receive data) with the server 302. The message-based interface may be established using various protocols including, but not limited to, transmission control protocol/internet protocol (TCP/IP). For instance, the servers 304a-304b send a notification request (represented by arrow 2) to request remote pointers 310a-310b from the server 302. The notification request is relayed by a server shard, and the client copy of the hash map is processed (represented by arrow 3) to locally look up remote pointers 310a-310b based on the keys in order to perform CRUD (Create, Read, Update, Delete) operations using RDMA on data values stored in the data locations 306a-306b of the server 302. In response, the server 302 replies (represented by arrow 4) to the client notifications by sending a hash map including the current hash <key,value> requested by the client 304a-304b. In addition, the server 302 can multicast full or incremental updates of the hash map to the clients 304a-304b at a designated time, e.g., when the hash map changes due to creation and deletion operations.

As further illustrated in FIG. 3, one or more node manager agents 308 constructed as a hardware computer processor, for example, are configured to access the data locations 306a-306b. The node manager agent 308 uses a management key as an access control mechanism. When the node manager agents 308 control of a data location 306a-306b, the node manager agents 308 assigns its management key, along with a lease period, to each a respective data location 306a-306b. The lease period serves as an agreement which allows the remote clients 304a-304b to perform RDMA accesses on a corresponding data location 306a-306b storing an item or value of interest until the lease period expires. Accordingly, the node manager agent 308 uses the management key to validate all future packets it receives within the lease period. If a management key field in a subnet management packet matches the management key value of the corresponding data locations 306a-306b, the packet is accepted. Otherwise the packet is discarded.

The RDMA architecture supports the notion of multiple node manager agents 308 and specifies how multiple node manager agents 308 negotiate for one to become a master node manager agent 308 of a particular data location 306a-306b. Once a node manager agent 308 gains control of a data location 306a-306b, it can retain control as long as it does not lose its management key of the data location 306a-306b. Loss of the management key can happen under several circumstances. This loss can happen through a power cycle of the component which contains the management key, with the component coming up with the default management key when the power to the component is restored. This loss also may happen when the management key lease period expires, in which the corresponding data location 306a-306b can be reclaimed by the server 302. Therefore, at least one embodiment provides a feature of dynamically tuning the lease period to prevent premature data location reclamation, and balance the trade-off between cache utilization and performance requirement.

According to a non-limiting embodiment, the cache management system 300 determines a popularity of the data locations 306a-306b to dynamically calculate the lease terms. The popularity of a particular data location 306a-306b is based on the frequency at which a particular data location 306a-306b is accessed by one or more clients 304a-304b. This frequency will be referred to as the access frequency rate. In order to provide an accurate frequency rate that takes into account the multitude of clients 306a-306b that may access a particular data location 306a-306b, an RDMA atomic operation referred to going forward as a "fetch/add" operation is performed. The atomic fetch/add operation can occur simultaneously or in sequence but without interruption for a specific task to be accomplished properly.

For instance, atomic operations may be implemented in spin-lock operations inside of an operating system and/or monotonically incrementing sequence numbers. In any instance, the fetch/add operation can be executed concurrently so as to update values in a data location at the same time while providing logically correct decisions without inadvertently overwriting data in the data location. That is, unlike non-atomic read/write operations performed according to TCP/IP protocols, for example, the atomic fetch/add operations executed by the cache management system 300 allows for simultaneous operations without intermediate interruption. Accordingly, the server 302 may include a separate frequency data location (not shown in FIG. 3) which is dynamically updated with access frequency rate data using the atomic fetch/add operations. In this manner, the server 302 can continuously be aware of the popularity of a particular data location and dynamically tune the corresponding lease period. That is, as the access frequency rate of a data location increases (e.g., the access frequency rate increases), the server 302 increases the duration of the lease period. As the popularity of the data location decreases (e.g., the access frequency rate decreases), the server 302 reduces the corresponding lease period.

Figure 4:
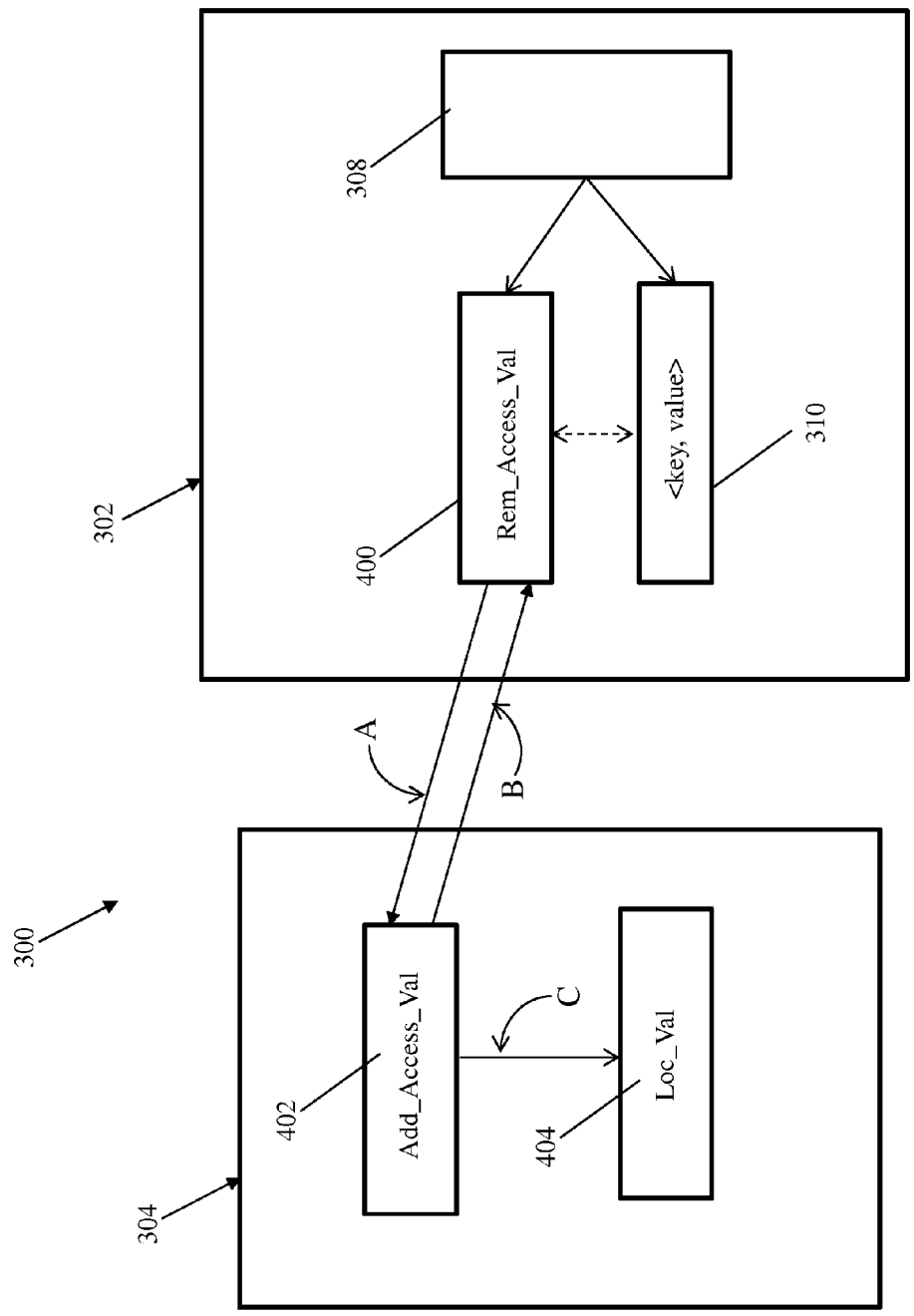
FIG. 4 is a block diagram illustrating a client performing an atomic fetch/add operation to update the access frequency rate corresponding data location stored in a server according to a non-limiting embodiment.

Turning to FIG. 4, a block diagram illustrates a client 304 performing an atomic fetch/add operation to update the access frequency rate corresponding data location stored in a server 302 according to a non-limiting embodiment. The server 302 and the client 304 include additional components to facilitate the fetch/add operation. The server 302 includes a frequency data location 400 configured to store a remote access value (Rem_Access_Val) indicative of the access frequency data corresponding to a particular data location 310 accessed by one or more clients 304. The client 304 includes an incrementing module 402 and a local data location 404.

In the event the client 304 needs to access the data location 310 defined by the remote pointer <key,value>, the client 304 determines an adjustment (i.e., an increment or a decrement) to be applied to the current Rem_Access_Val (i.e., the current access frequency data) as described above. The fetch/add operation then applies the determined adjustment atomically, and returns the previous value if the particular client 304 was the only client (among a plurality of clients) to access the location at that time. If the location undergoes multiple concurrent accesses, then the client 304 returns one of the logical intermediate values. Thus, the updated Rem_Access_Val can be simultaneously added to the frequency data location 400 and the local data location 404. In this manner, the clients 304 can dynamically track the access frequency rate locally, while the node manager agent 308 can continuously monitor the frequency data location 400 stored in the server 302 to determine the access frequency rate of the corresponding data location 310. Accordingly, the node manager agent 308 can monitor the popularity of the data location 310, and in response dynamically tunes the lease period assigned to the data location 310. Although the operation of a single client 304 is illustrated in FIG. 4, it should be appreciated that the cache management system 300 may include a multitude of clients 304 performing similar atomic fetch/add operations to continuously adding its local contribution to the frequency data location 400 of the server 302. In addition, the server 302 may add its contribution to the frequency data 400. Accordingly, the access frequency rate data stored in the frequency data location 400 can be viewed as global information accessible by the server 302 and each client 304 in the cache management system 300.

According to a non-limiting embodiment, the Rem_Access_Val stored in the frequency data location 400 is based on an access frequency rate differential ($\Delta f$). More specifically, a first access frequency rate (f1) during a first time period (T1) is determined by a client 304. That is, the client may determine f1 based on the number of times the client is requested to access the data location 306 during T1. The time period can be any time period (e.g., 1 millisecond, 1 second, 1 minute, etc.) that allows for determining the trend of the access frequency rate corresponding to a particular data location 310. At startup, for example, each client 304 included in the cache management system 300 may add an initial f1 without performing a differential calculation so as to create an initial access frequency reference value.

After T1 expires, the client 304 determines a second access frequency rate (f2) during the following time period (T2). The client 304 then calculates the $\Delta f$ based on the difference between f2 and f1. If $\Delta f$ is positive, then client 304 increments Rem_Access_Val with the current $\Delta f$ value. If, however, $\Delta f$ is negative, then the client 304 decrements Rem_Access_Val by the current $\Delta f$ value. In at least one embodiment, a client 304 decides not update the frequency data location 400 when $\Delta f$ is determined to be zero. Accordingly, the server 302 can maintain a sum of the access frequency rates contributed by all clients 304 included in the cache management system 300. In this manner, the server 302 can dynamically tune the lease period corresponding to the data location 310 based on the access frequency rate sum stored in the frequency data location 400 at any moment.

According to a non-limiting embodiment, each client 304 may ultimately determine whether to add the current $\Delta f$ to the frequency data location 400 based on threshold value ($f_{TH}$). That is, each client 304 compares the current $\Delta f$ to $f_{TH}$. When $\Delta f$ exceeds $f_{TH}$, then the client 304 updates the frequency data location 400, i.e., increments or decrements Rem_Access_Val with the current $\Delta f$. According to a non-limiting embodiment, $f_{TH}$ can by dynamically adjusted as the access frequency rate increases or decreases. For instance, when Rem_Access_Val is high, thus indicating the data location 310 is currently popular, the $f_{TH}$ can be set to a first value. As Rem_Access_Val decreases, the $f_{TH}$ can be adjusted to a different value, and vice versa.

According to a non-limiting embodiment, the cache management system 300 is configured to execute one or more restoration actions if the system 300 encounters an error event. In the event one or more clients 304 fail or crash, for example, the server initiates a reset operation. The reset operation begins with the server 302 globally outputting a reset bit (e.g., 1 bit) indicating to all clients 304 that the cache management system 300 will be reset. In response to receiving the reset bit, the clients 304 refrain from updating the frequency data location 400. The reset bit may be output a single time or may be continuously output so that it can be assured each client 304 has received the reset bit.

When the server 302 is ready to reinstate access frequency updates, the server 302 will transition the reset bit from 1 to 0. In response to a bit transition, the servers 304 will again add an initial contribution f1 (as opposed to $\Delta f$) to the frequency data location 400 during the first time period (T1) following the reset, and will subsequently update the frequency data location 400 with $\Delta f$ in the following time periods as discussed above. In at least another embodiment, the clients 304 wait a predetermined amount of time in response to receiving the reset bit (e.g., 0 or 1) before updating the frequency data location 400. The reset bit can be delivered using a separate individual signal and/or can be a high order bit embedded in another data signal such as, for example, the remote pointer.

Figure 5:
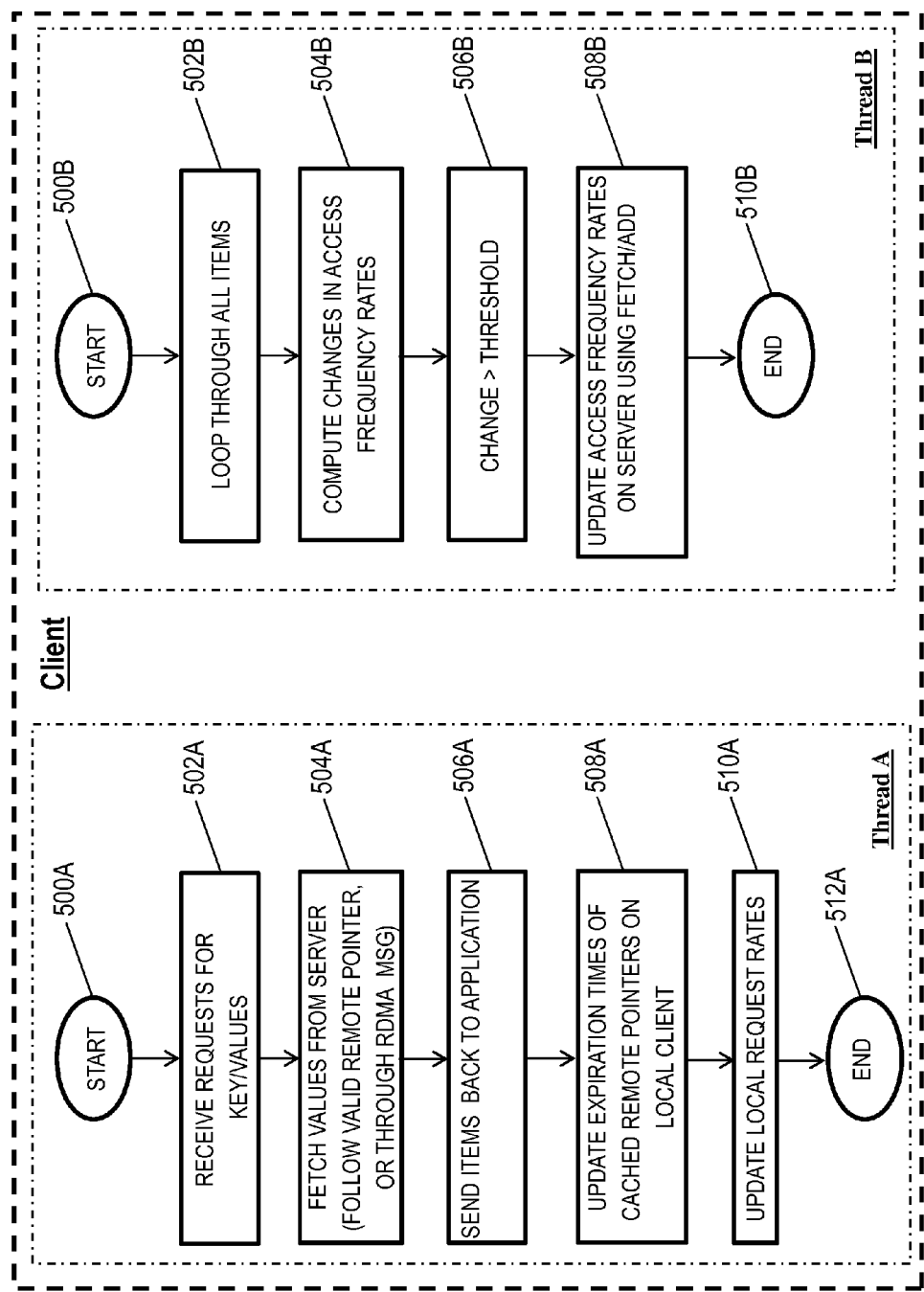
FIG. 5 are flow diagrams illustrating a method of operating a client included in a cache management system configured to perform cache management of an RDMA key/value data store according to a non-limiting embodiment.
Figure 6:
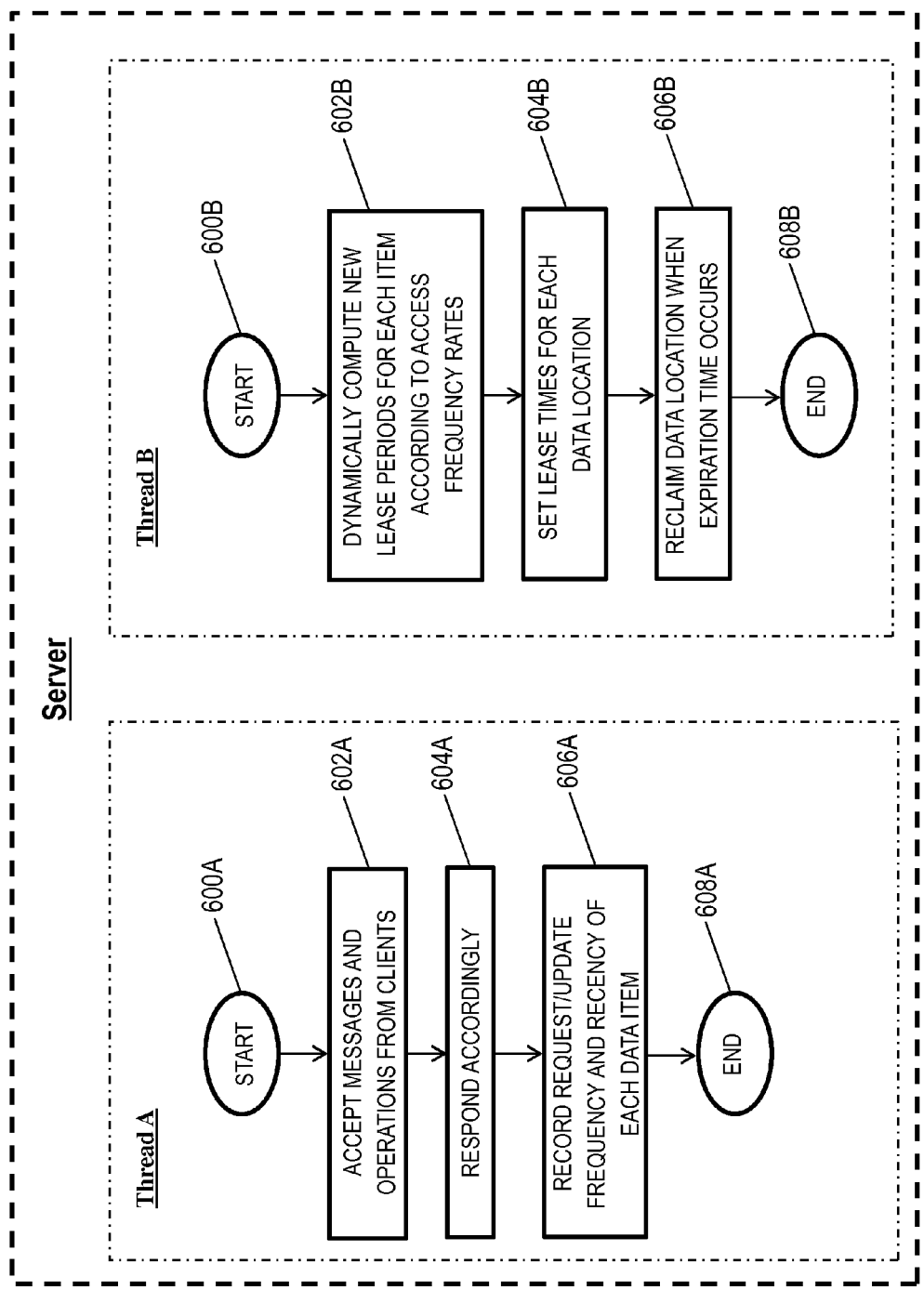
FIG. 6 are flow diagrams illustrating a method of operating a server included in a cache management system configured to perform cache management of an RDMA key/value data store according to a non-limiting embodiment.

Referring to FIGS. 5-6, flow diagrams illustrate the operation of a client and server, respectively, included in a cache management system according to a non-limiting embodiment. Each of the client and the server execute dual thread methods during operation. Turning first to the client operation illustrated in FIG. 5, a first thread (Thread A) begins at operation 500A, and at operation 502A the client receives requests for items located in a data location remotely stored in a server. The request may be initiated, for example, by an application operating in accordance with the client. At operation 504A, the client fetches a data value or data item from the data location remotely stored in the server. The item may be fetched using a remote pointer in accordance to an atomic fetch/add operation under RDMA and/or using a message-based protocol including, for example, TCP/IP. The remote pointer utilizes a hash <key,value> corresponding to a data location storing the item requested by the application. At operation 506A, the fetched item is relayed from the client to the application. At operation 508A, the client locally updates the expiration time (i.e., the current lease period) of the data location corresponding to the remote pointer of the requested item. At operation 510A, the client locally updates the access frequency rate of the data location corresponding to the remote pointer of the requested item, and the method ends at operation 512A.

Still referring to FIG. 5, the client may simultaneously operate according to a second thread (Thread B). Thread B begins at operation 500B, and at operation 502B the client loops through all items or data values requested by one or more applications. At operation 504B, the client computes changes in access frequency rates. According to a non-limiting embodiment, the client determines an access frequency rate differential ($\Delta f$) based on a first time period (T1) and a following second time period (T2). At operation 506B, the client determines that $\Delta f$ is greater than a frequency threshold ($f_{TH}$). At operation 508B, the client updates a frequency data location on the server according to an atomic add/fetch operation, and the method ends at operation 510B.

Turning now to FIG. 6, flow diagrams illustrate the operation of the server. A first server thread (Thread A) begins at operation 600A, and at operation 602A the server accepts receives a messages and operations from one or more clients. According to a non-limiting embodiment, the server receives a request for a valid remote pointer <key, value>. At operation 604A, the server returns the valid remote pointer <key,value> and the item corresponding to the remote pointer to the client. At operation 606A, the server updates a frequency data location in response to accessing the corresponding data location and the method ends at operation 608A.

Still referring to FIG. 6, the server may simultaneously operate according to a second thread (Thread B). Thread B begins at operation 600B, and at operation 602B the server dynamically tunes the lease period for item stored in a corresponding data location based on the access frequency rate of the data location. At operation 604B, the server assigns the tuned lease period to the corresponding data location. At operation 606B, the server reclaims the data location when the lease period expires, and the method ends at operation 608B.

According to various embodiments described above, a cache management system is provided that is configured to perform cache management for Remote Direct Memory Access (RDMA) key/value data store based on atomic operations. In at least one non-limiting embodiment, one or more servers are configured to dynamically compute a lease period based on the popularity of a data location. In at least one embodiment, the server determines the popularity of a data location based on an access frequency rate of the data location. The access frequency rate is continuously updated according to atomic fetch/add operations performed by the clients included in the cache management system. Based on the access frequency rate, the server dynamically tunes a lease period of the data location. The lease time stands as a pact between server and client to guarantee the availability of the data so that clients can efficiently retrieve the data by using RDMA Read, while also preventing premature eviction and reclamation of key/value items stored in the cache. In this manner, the cache management system according to various embodiments is capable of specifically keeping track of the access frequency of the cached data thereby incurring very little overhead while also preserving the validity of key/value items in the cache.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". As used herein, the term "module" may refer to an application specific integrated circuit (ASIC), an electronic circuit, an electronic computer processor (shared, dedicated, or group), a microcontroller, and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method. Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code, when created and stored on a tangible medium (including but not limited to electronic memory modules, random access memory (RAM), dynamic RAM (DRAM), non-battery-back RAM, non-volatile RAM (NVRAM), ROM (including PROM, EEPROM, etc.), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language, assembly language, machine language (including language used in microcode and embedded implementation), or other similar programming languages. The program code may execute entirely on the user's computer, partly on the user's computer, as a stand-alone software package, partly on the user's computer and partly on a client or entirely on the client or server. In the latter scenario, the client may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of performing cache management in a Remote Direct Memory Access (RDMA) key value data store, the method comprising:
    receiving a request from at least one client configured to access a data item stored in a data location of a remote server;
    determining a popularity of the data item based on a frequency at which the data location is accessed by the at least one client; and
    calculating a lease period of the item based on the frequency and assigning the lease period to the data location, and maintaining accessibility of the data location to the at least one client for a duration of the lease period,
    wherein determining the popularity of the data item further comprises using a RDMA remote pointer to perform an atomic fetch/add operation to update, by the at least one client, a frequency data location stored in the remote server with access frequency data indicating the frequency at which the data location is accessed by the at least one client without requiring the remote server to process a read request.

2. The method of claim 1, wherein the frequency is based on a frequency differential between a first frequency during a first time period and a second frequency during a second subsequent time period.

3. The method of claim 2, further comprising dynamically tuning the lease period as the frequency differential changes over time.

4. The method of claim 3, further comprising resetting the cache management system by deleting the frequency from the frequency data location in response to an error event.

5. The method of claim 4, further comprising reclaiming by the remote server the data location by deleting the data item in response to expiration of the lease period.

6. The method of claim 1, further comprising controlling access of the data location via a hardware controller, and bypassing the controller, via the at least one client, when performing the atomic fetch/add operation to update the frequency data location.

* * * * *